(12) United States Patent
Tiwari et al.

(10) Patent No.: US 9,076,223 B1
(45) Date of Patent: Jul. 7, 2015

(54) FAST STOPPING CRITERION FOR ACTIVE CONTOUR ALGORITHMS

(71) Applicant: THE MATHWORKS, INC., Natick, MA (US)

(72) Inventors: Spandan Tiwari, Framingham, MA (US); Steven L. Eddins, Milford, MA (US)

(73) Assignee: The MathWorks, Inc., Natick, MA (US)

( * ) Notice: Subject to any disclaimer, the term of this patent is extended or adjusted under 35 U.S.C. 154(b) by 159 days.

(21) Appl. No.: 13/777,695

(22) Filed: Feb. 26, 2013

Related U.S. Application Data

(60) Provisional application No. 61/735,805, filed on Dec. 11, 2012.

(51) Int. Cl.
*G06T 7/00* (2006.01)

(52) U.S. Cl.
CPC .................................. *G06T 7/0089* (2013.01)

(58) Field of Classification Search
CPC ................................ G06K 9/48; G06T 7/0089
See application file for complete search history.

(56) References Cited

U.S. PATENT DOCUMENTS

| | | | | |
|---|---|---|---|---|
| 6,031,935 | A * | 2/2000 | Kimmel | 382/173 |
| 6,731,799 | B1 * | 5/2004 | Sun et al. | 382/173 |
| 6,941,016 | B1 * | 9/2005 | Wagman et al. | 382/199 |
| 7,657,299 | B2 * | 2/2010 | Huizenga et al. | 600/410 |
| 8,218,869 | B2 * | 7/2012 | Porikli et al. | 382/173 |
| 2007/0130188 | A1 * | 6/2007 | Moon et al. | 707/101 |
| 2008/0075375 | A1 * | 3/2008 | Unal et al. | 382/243 |
| 2008/0170791 | A1 * | 7/2008 | Eskildsen et al. | 382/199 |
| 2010/0077015 | A1 * | 3/2010 | Eshghi et al. | 708/400 |
| 2012/0230592 | A1 * | 9/2012 | Iwamura et al. | 382/201 |

OTHER PUBLICATIONS

Fast Contour Matching Using Approximate Earth Mover's Distance: Kristen Grauman, Trevor Darrell, Dec. 2003, Massachusetts Inst. of Technology, Computer Science and Artificial Intelligence Laboratory.*
Learning Geometric Hashing Functions for Model based Obejct Recognition, George Bebis, Univerisity of Central Florida, Department of Computer Science, IEEE 1995.*
Perceptual Hash Functions based on Contorulet Transform and Singular Value Decomposition, Ting-ting Zhu, Department of Information Security, Naval Univ. of Engineering, Wuhan, China, 2009 International Conference on Multimedia Information Networking and Security.*

(Continued)

*Primary Examiner* — Bernard Krasnic
*Assistant Examiner* — Pinalben Patel
(74) *Attorney, Agent, or Firm* — Harrity & Harrity, LLP

(57) ABSTRACT

A device is configured to determine a contour vector that delineates an object in an image from a remaining portion of the image, and to generate a hash value by applying a hash function to the contour vector. The device is configured to compare the hash value to a previous hash value generated by applying the hash function to a previous contour vector, where the previous contour vector is determined prior to determining the contour vector. The device is configured to determine that the hash value matches the previous hash value and, based on determining that the hash value matches the previous hash value, segment the image using the contour vector.

20 Claims, 8 Drawing Sheets

(56) References Cited

OTHER PUBLICATIONS

Topology and Shape Constraints on Parametric Active Contours: Computer Vision and Image Understanding 83 (2), pp. 140-171, Sep. 2001, H. Delingette.*

Whitaker, Ross T., "A Level-Set Approach to 3D Reconstruction from Range Data," International Journal of Computer Vision 29(3), 1998, pp. 203-231.

Chan, Tony F., "Active Contours Without Edges," IEEE Transactions on Image Processing, vol. 10, No. 2, Feb. 2001, pp. 266-277.

* cited by examiner

| Iteration 510 | Hash Value 520 | Maximum Iteration 530 | History Length 540 |
|---|---|---|---|
| 142 | A257LK62T74P9W85 | 200 | 5 |
| 143 | Y76BH8U732HT93S5 | 200 | 5 |
| 144 | G52O7584G763M52T | 200 | 5 |
| 145 | KP547H7D52L4WR89 | 200 | 5 |
| 146 | A257LK62T74P9W85 | 200 | 5 |

FAST STOPPING CRITERION FOR ACTIVE CONTOUR ALGORITHMS

RELATED APPLICATION

This application claims priority under 35 U.S.C. §119 based on U.S. Provisional Patent Application No. 61/735,805, filed on Dec. 11, 2012, the content of which is incorporated by reference herein in its entirety.

BRIEF DESCRIPTION OF THE DRAWINGS

FIG. 5 is a diagram of an example data structure that stores information associated with one or more contour vectors.

DETAILED DESCRIPTION

The following detailed description refers to the accompanying drawings. The same reference numbers in different drawings may identify the same or similar elements.

Users of computer devices may use image segmentation to identify one or more objects in an image (e.g., a digital image, a picture, etc.). Image segmentation may include the process of dividing an image into multiple regions corresponding to one or more surfaces, objects, or natural parts of objects. To achieve image segmentation, a user device (e.g., an image processor) may employ a contour algorithm to generate a contour surrounding an edge of the object. A contour may include a line that forms a boundary (e.g., an edge) between the object and the surrounding image. The contour algorithm may follow a step-by-step procedure for producing the contour, with each iteration (e.g., step) generating a contour that is a better approximation of the contour of the object than the previous contour of the previous iteration. The contour algorithm may continue until the contour has converged (e.g., the contour has settled onto the boundaries of the object). A user device may use a stopping criterion to determine when the contour has converged. For example, the user device may determine that the contour has converged when the contour of the current iteration matches the contour of the previous iteration (e.g., when the contour has stopped evolving from iteration to iteration).

In some implementations, the contour algorithm may include an active contour algorithm (e.g., a sparse-field method) that is approximate in nature. The approximate nature of the active contour allows for faster computation of the contour of the object. However, a contour associated with the active contour algorithm may change slightly from iteration to iteration (e.g., oscillate), even though the contour has converged (e.g., settled onto the object boundaries). For example, the contour in the active contour algorithm may include a pixel (e.g., a point of color) in one iteration, but not include the pixel in the next iteration. The active contour algorithm may oscillate between these two states indefinitely. Implementations described herein may allow a user device to determine that the contour has converged by detecting oscillations in the contours of the active contour algorithm.

Figure 1A:
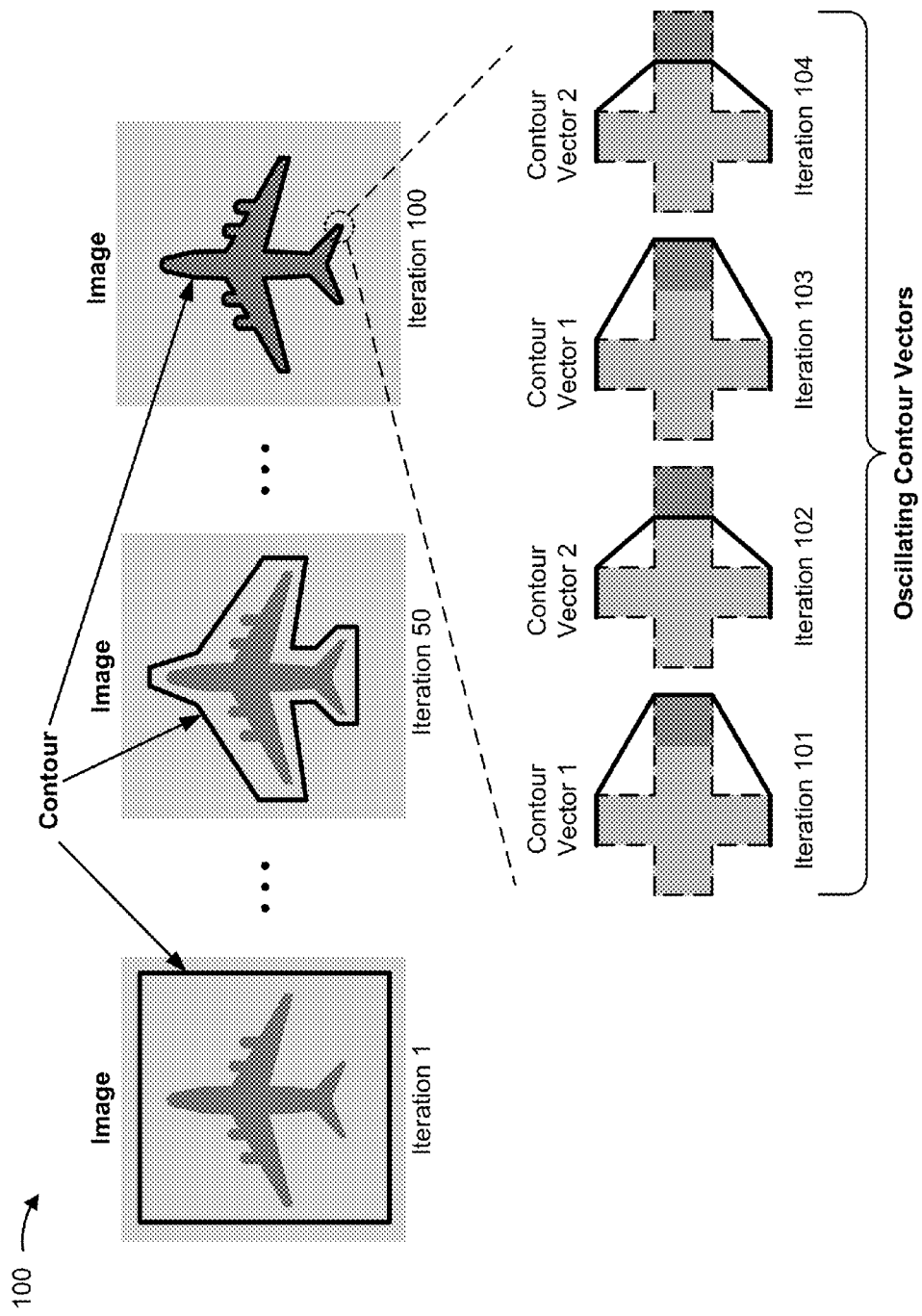
FIGS. 1A and 1B are diagrams of an overview of an example implementation described herein.
Figure 1B:
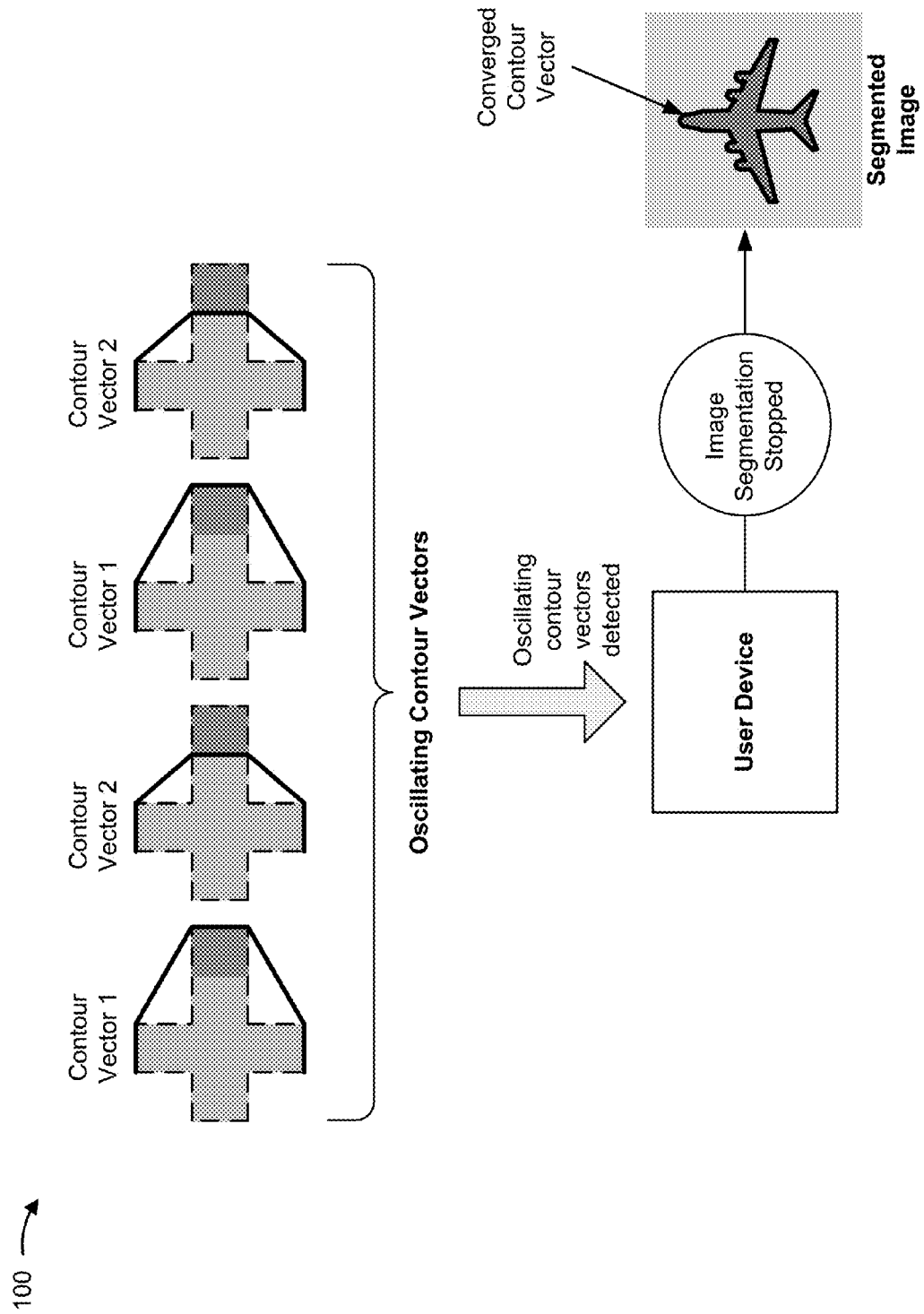

FIGS. 1A and 1B are diagrams of an overview of an example implementation 100 described herein. As shown in FIG. 1A, example implementation 100 may include an image (e.g., an image of an airplane in the sky) and a contour surrounding an object (e.g., the airplane) in the image. The contour may include a curve (e.g., a line) that forms a boundary (e.g., an edge) between the object (e.g., the airplane) and the surrounding image (e.g., the sky). In some implementations, the contour may be generated by a contour algorithm. The contour algorithm may proceed through a quantity of iterations, and may generate a contour vector that describes the contour associated with each iteration.

As further shown in FIG. 1A, the contour algorithm may proceed through a quantity of iterations, starting with a first iteration (e.g., "Iteration 1"). At each iteration, the contour algorithm may generate a contour vector that better approximates the boundary of the object than the previous contour vector generated during the previous iteration. After some quantity of iterations (e.g., "Iteration 100") the contour vector may have converged (e.g., settled on the boundary of the object). Although the contour vector may have converged around the object, the contour may continue to change slightly from iteration to iteration.

As further shown in FIG. 1A, a contour vector in one iteration (e.g., "Iteration 101") may include a particular pixel, while the contour vector in the next iteration (e.g., "Iteration 102") may not include the pixel. The contour vector in the following iteration (e.g., "Iteration 103") may again include the pixel, and the contour vector in the subsequent iteration (e.g., "Iteration 104") may not include the pixel. When a contour vector associated with an iteration of the contour algorithm (e.g., "Iteration 104") matches a previous contour vector associated with a previous iteration (e.g., "Iteration 102") the contour algorithm may be described as oscillating between contour vectors.

As shown in FIG. 1B, a user device may detect the oscillating contour vectors generated by the contour algorithm. The user device may use the detection of the oscillating contour vectors as a stopping criterion to stop the contour algorithm from proceeding to an additional iteration. Implementations described herein may allow a user device to determine that a contour vector has converged around the boundaries of an object in an image by detecting oscillations in the contour vectors.

Figure 2:
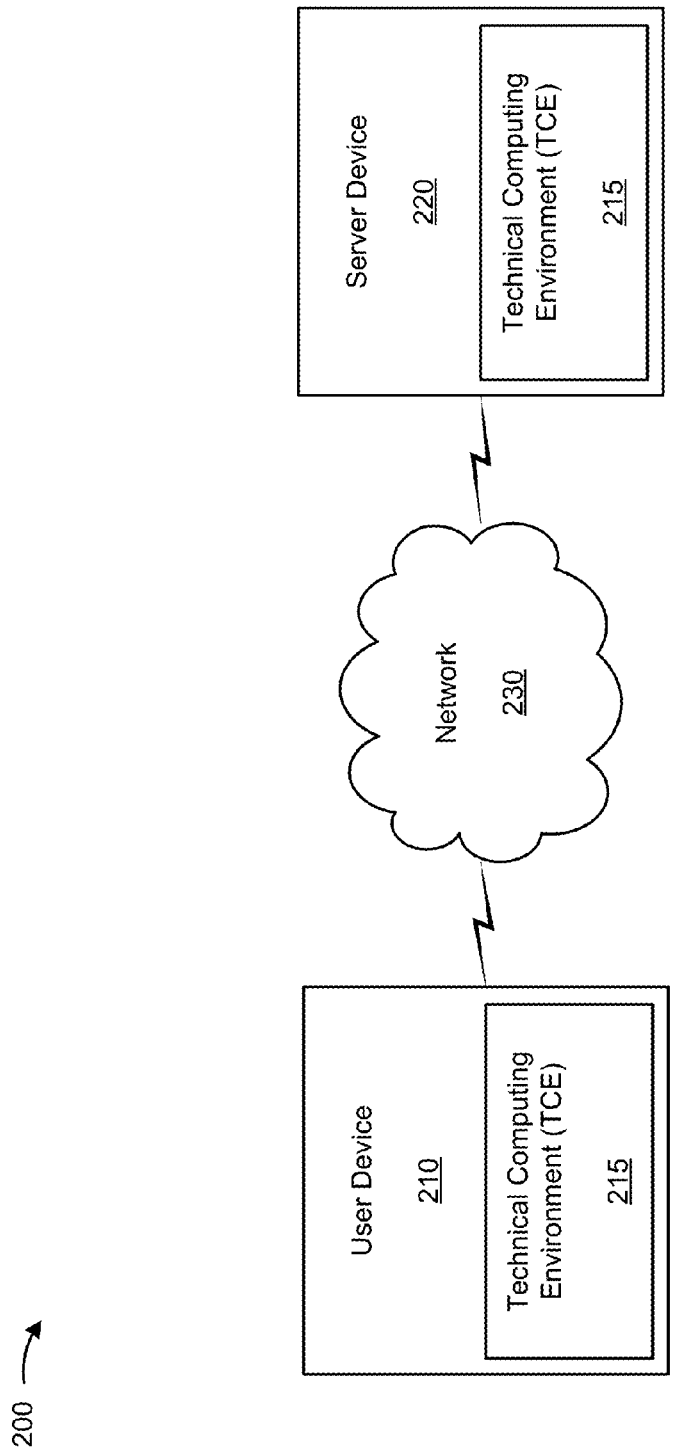
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a server device 220, and a network 230. Devices of environment 200 may interconnect via wired connections, wireless connections, or a combination of wired and wireless connections.

User device 210 may include a device capable of segmenting an image. For example, user device 210 may include a computing device (e.g., a desktop computer, a laptop computer, a tablet computer, a handheld computer, a server, etc.), a mobile phone (e.g., a smart phone, a radiotelephone, etc.), or a similar device. In some implementations, user device 210 may receive information from and/or transmit information to server device 220 (e.g., information associated with image segmentation).

As shown, user device 210 may include a technical computing environment (TCE) 215 that allows tasks to be performed (e.g., by users) related to disciplines, such as, but not limited to, mathematics, science, engineering, medicine, and business. TCE 215 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; etc.), or another type of environment, such as a hybrid environment that may include, for example, a text-based environment and a graphically-based environment.

Server device 220 may include one or more devices capable of receiving, storing, processing, and/or transmitting information, such as information associated with an image and/or image segmentation. For example, server device 220 may include a computing device, such as a server, a desktop computer, a laptop computer, a tablet computer, a handheld computer, or a similar device. In some implementations, server device 220 may include a technical computing environment, such as TCE 215. Additionally, or alternatively, server device 220 may receive information from and/or transmit information to user device 210.

Network 230 may include one or more wired and/or wireless networks. For example, network 230 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
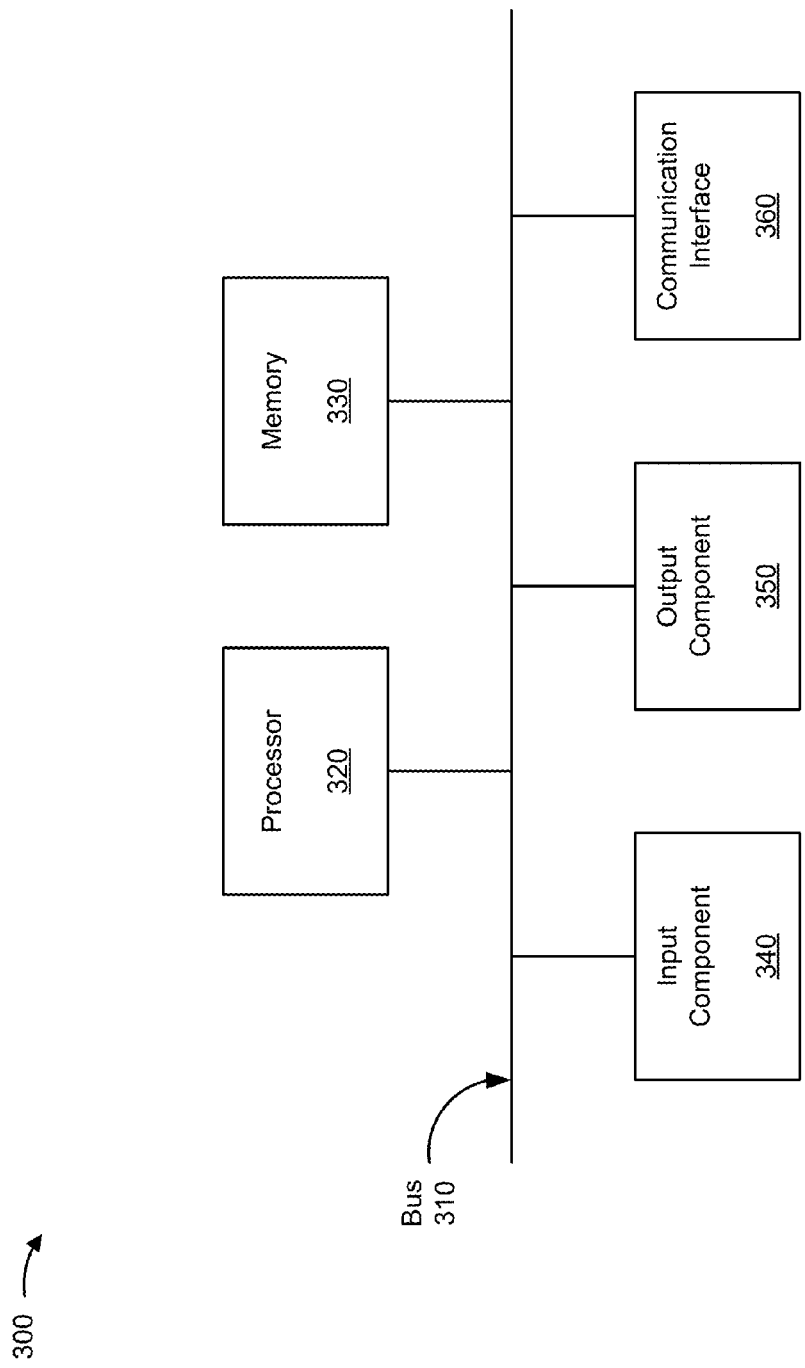
FIG. 3 is a diagram of example components of one or more devices of FIG. 2.

FIG. 3 is a diagram of example components of a device 300. Device 300 may correspond to user device 210 and/or server device 220. Additionally, or alternatively, each of user device 210 and/or server device 220 may include one or more devices 300 and/or one or more components of device 300. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, a communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
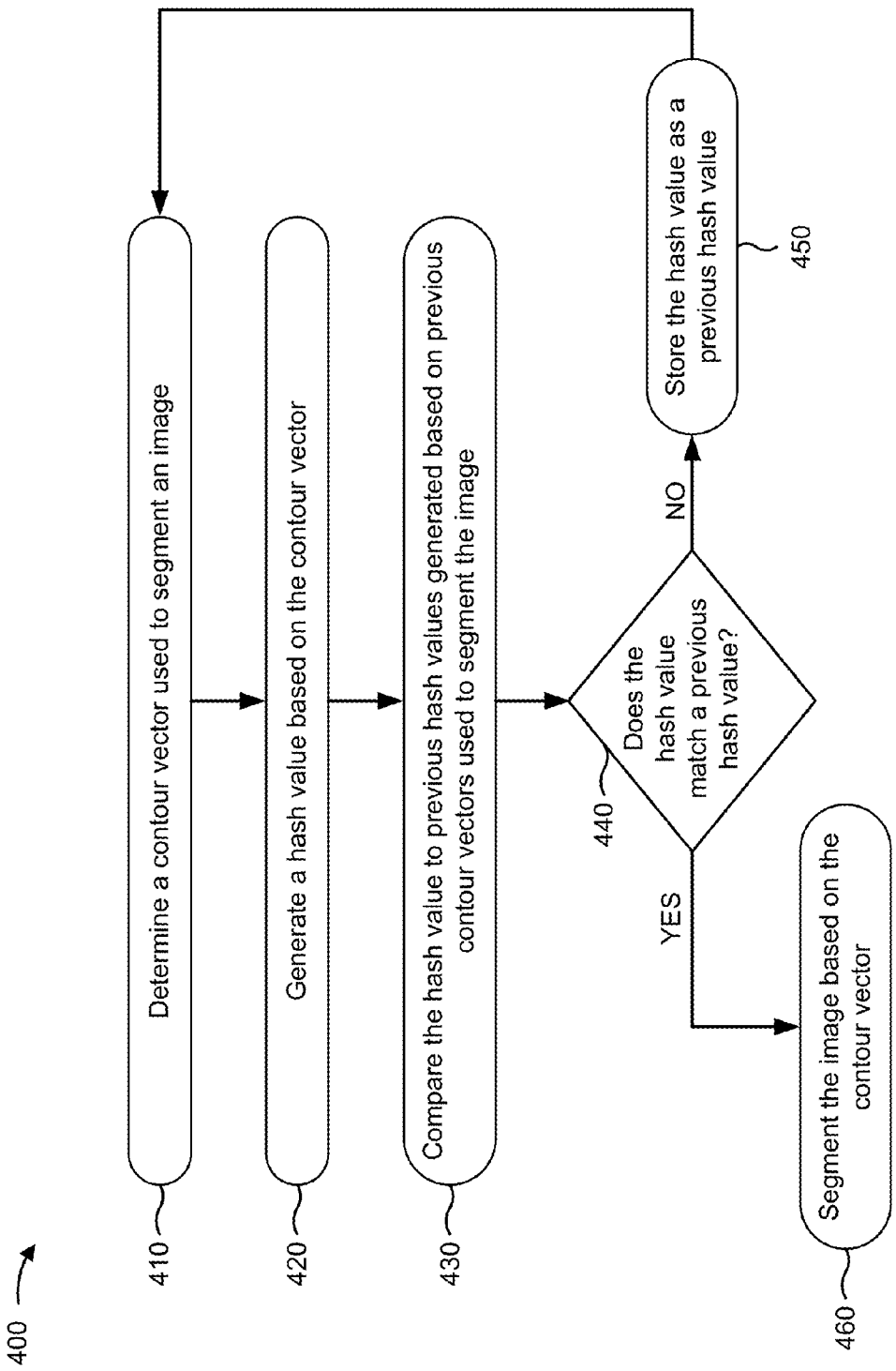
FIG. 4 is a flow chart of an example process for segmenting an image.

FIG. 4 is a flow chart of an example process 400 for segmenting an image. In some implementations, one or more process blocks of FIG. 4 may be performed by user device 210. Additionally, or alternatively, one or more process blocks of FIG. 4 may be performed by another device or group of devices separate from or including user device 210, such as server device 220.

As shown in FIG. 4, process 400 may include determining a contour vector used to segment an image (block 410). For example, user device 210 may load an image from memory and/or may receive input from a user (e.g., a user of user device 210) to obtain an image. Additionally, or alternatively, user device 210 may receive an image from server device 220. User device 210 may determine a contour vector used to segment the image.

In some implementations, user device 210 may determine a contour vector associated with an object in the image. The image may include a two-dimensional image (e.g., a picture, a 2-D model, etc.), a three-dimensional image (e.g., a 3-D model, a 3-D volume image, etc.), or the like. The object may occupy one or more regions of the image. The object may include a one-dimensional curve (e.g., a line), a two-dimensional plane (e.g., a surface), a three-dimensional shape, and so forth. A contour may include a shape that defines a boundary (e.g., an edge, an outline, etc.) between the object and the surrounding image. For example, the contour may include a curve (e.g., a line) surrounding a two-dimensional object, a surface encompassing a three-dimensional object, and so forth.

User device 210 may determine a contour vector associated with the object. A contour vector may include a list (e.g., an array) of points (e.g., pixels, coordinates, etc.) that form the contour. For example, the contour vector may include a list of coordinates (e.g., x-y coordinates defining a two-dimensional contour vector, x-y-z coordinates defining a three-dimensional contour vector, etc.) that describe the shape of the contour vector in a coordinate system. Additionally, or alternatively, the contour vector may include a list of pixels represented on a display of a device, such as user device 210. A pixel may include the smallest controllable element of a picture represented on a screen (e.g., a point of color, a physical point in a raster image, etc.).

In some implementations, user device 210 may use a contour algorithm to determine the contour vector. A contour algorithm may include an iterative (e.g., step-by-step) procedure for producing the contour vector surrounding an object. Each iteration (e.g., step) of the procedure may generate a contour vector that is a better approximation of the contour (e.g., the boundary) surrounding the object. For example, a first iteration may produce a first contour vector that approximates the object. A second iteration may produce a second contour vector that better approximates the object (e.g., is closer to the true boundary of the object). In this manner, the contour algorithm may continue, iteration-by-iteration, until a contour vector is generated that closely approximates the contour (e.g., the boundary, the outline, the surface, etc.) of the object.

The contour algorithm may continue, iteration-by-iteration, until a stopping criterion is satisfied. For example, user device 210 may stop the contour algorithm after a certain quantity of iterations (e.g., after 200 iterations, after 1000 iterations, etc.). Additionally, or alternatively, the stopping criterion may be based on identifying a match between a current contour vector and a preceding contour vector. For example, user device 210 may compare a current contour vector (e.g., the contour vector associated with a current iteration) with a preceding contour vector (e.g., the contour vector associated with the preceding iteration) to determine whether the current contour vector matches the preceding contour vector.

In some implementations, the contour algorithm may include an active contour algorithm. The active contour algorithm may include an algorithm that guides a curve (e.g., on a two-dimensional image) and/or a surface (e.g., on a three-dimensional image) through a series of iterations until the curve and/or the surface has settled on the boundary of the object. The curve and/or the surface may correspond to one or more contour vectors. In some implementations, the active contour algorithm may start with an initial contour vector (e.g., defining a starting curve and/or a starting surface).

In some implementations, the initial contour vector may be defined arbitrarily. For example, the initial contour vector may be defined by user device 210. Additionally, or alternatively, the initial contour vector may be defined by the contour algorithm based on one or more qualities of the image (e.g., gradient, smoothness, color, contrast, etc.). For example, the contour algorithm may generate the initial contour vector to enclose a region of high contrast on the image. In some implementations, the initial contour vector may be defined by a user, such as a user of user device 210. For example, the user of user device 210 may select the initial contour vector from one or more possible starting contour vectors. Additionally, or alternatively, the user of user device 210 may generate the initial contour vector by inputting information describing the initial contour vector into user device 210. For example, the user of user device 210 may use an input (e.g., a computer keyboard, a computer mouse, a touchscreen screen on a computer display, etc.) to generate the initial contour vector by tracing (e.g., enclosing) the object on the image.

In some implementations, an active contour algorithm may act on the initial contour vector to generate a second contour vector (e.g., generated during a second iteration) that better approximates a boundary of the curve and/or surface than the initial contour vector. The active contour algorithm may include a set of logical constraints that shape the contour over a series of iterations. The active contour algorithm may then act on the second contour vector to generate a third contour vector (e.g., generated during the third iteration) that better approximates the boundary of the curve and/or surface than the second contour vector. The active contour algorithm may continue to generate, iteration-by-iteration, a series of contour vectors that better approximates the boundaries of the object with each iteration. In this manner, the active contour algorithm may cause the initial curve and/or the initial surface to envelop the object and/or settle on the boundaries of the object over a quantity of iterations.

In some implementations, the algorithm may be based on an internal characteristic and/or an external characteristic of the contour vector. The internal characteristic may be associated with one or more properties (e.g., curvature, smoothness, etc.) of the contour vector. The external characteristic may be associated with one or more properties (e.g., gradient, region statistics, etc.) of the image. In some implementations, the active contour algorithm may define the internal characteristic and/or the external characteristic to cause the initial curve and/or initial shape to envelop the object and/or settle on the boundaries of the object over a series of iterations.

In some implementations, the one or more properties of the internal characteristic and/or external characteristic may be provided by user device 210. For example, a user of user device 210 may input (e.g., via a keyboard, a keypad, a touch screen, etc.), into user device 210, information defining the one or more properties of the internal characteristic and/or the external characteristic. For example, a user of user device 210 may select a curvature associated with the internal characteristic and/or a gradient associated with the external characteristic.

As further shown in FIG. 4, process 400 may include generating a hash value based on the contour vector (block 420). For example, user device 210 may generate a hash value associated with the contour vector. In some implementations, user device 210 may generate the hash value by use of a hash function (e.g., a cryptographic hash function). The hash function may include an algorithm (e.g., a subroutine, a program, etc.) that takes input information (e.g., a sequence of characters, an array, a vector, etc.) and returns a hash value. The hash value may include a fixed-size string (e.g., a sequence of characters of a fixed length) that uniquely identifies the input information. In some implementations, the hash function may include an encryption (e.g., hashing) algorithm, such as Message-Digest 5 (MD5), Secure Hash Algorithm (SHA)-1, SHA-2, or the like.

In some implementations, the input information may include a contour vector generated by the contour algorithm. For example, user device 210 may generate a contour vector associated with an iteration of the contour algorithm. User device 210 may use the hash function to generate a hash value based on a contour vector associated with the iteration. In some implementations, the hash value may be a string of finite length (e.g., 16 bytes, 32 bytes, etc.). Additionally, or alternatively, the hash value may include numbers (e.g., integers, floating point numbers, etc.), letters, symbols, characters, or the like.

In some implementations, user device 210 may generate the hash value at each iteration of the contour algorithm. For example, user device 210 may generate a first contour vector associated with a first iteration of the contour algorithm, and may generate a first hash value (e.g., by use of a cryptographic hash function) based on the first contour vector. User device 210 may generate a second contour vector associated with a second iteration of the contour algorithm, and may generate a second hash value based on the second contour vector. In this manner, user device 210 may generate one or more hash values based on one or more contour vectors.

In some implementations, user device 210 may store the hash value in a data structure (e.g., data structure 500, FIG. 5). For example, user device 210 may generate hash values based on contour vectors at each iteration of the contour algorithm, and may store the hash values in the data structure as the contour algorithm proceeds through each iteration. Additionally, or alternatively, user device 210 may store, in the data structure, information identifying one or more hash values after one or more iterations of the contour algorithm (e.g., after five iterations, after 10 iterations, etc.).

As further shown in FIG. 4, process 400 may include comparing the hash value to previous hash values generated based on previous contour vectors used to segment the image (block 430). For example, user device 210 may compare the hash value to one or more previous hash values generated based on previous contour vectors. A previous hash value may include one or more hash values associated with one or more contour vectors generated during one or more previous iterations.

In some implementations, user device 210 may determine the quantity of previous hash values to compare to the current hash value by use of a history length. The history length may specify a quantity of previous iterations and/or a quantity of previous hash values associated with the quantity of previous iterations. For example, the history length may specify a quantity (e.g., five) indicating that the current hash value is to be compared to the quantity (e.g., five) of previous hash values (e.g., the five previous hash values).

In some implementations, user device 210 may determine a vector length associated with the contour vector. The vector length may be expressed as a single value (e.g., a number) and/or a string of characters identifying the length of the contour vector. For example, the vector length may include information identifying a quantity of pixels associated with the contour vector, a quantity of coordinates defining the contour vector, a quantity of items in an array that represents the contour vector, or the like. User device 210 may store the vector length in a data structure.

In some implementations, user device 210 may compare the vector length associated with a current contour vector (e.g., the contour vector associated with the current iteration of the contour algorithm) to the vector length of a previous contour vector associated with a previous iteration. In some implementations, if the current vector length matches a previous vector length, user device 210 may then compare the current hash value (e.g., the hash value identifying the current contour vector associated with the current vector length) to the previous hash value (e.g., the hash value identifying the previous contour vector associated with the previous vector length). Additionally, or alternatively, if the current vector length does not match any of the previous vector lengths, user device 210 may continue to the next iteration of the contour algorithm.

As further shown in FIG. 4, process 400 may include determining whether the hash value matches a previous hash value (block 440). In some implementations, matching hash values in different iterations may indicate a contour vector oscillation. The contour vector oscillation may include an instance where a particular contour vector is associated with two or more iterations, within a subset of iterations, of the contour algorithm. User device 210 may detect a contour vector oscillation by detecting a match between the contour vectors associated with two or more iterations of the contour vector algorithms (e.g., by detecting matching contour vector coordinates, matching contour vector lengths, matching hash values, etc.). For example, user device 210 may generate the particular contour vector in a given iteration of the contour algorithm. Several iterations later, user device 210 may generate the same particular contour vector in a subsequent iteration of the contour algorithm. The existence of the same particular contour vector associated with two or more iterations of the contour algorithm may indicate that the current contour vector (e.g., the contour vector associated with the current iteration of the contour algorithm) may have converged (e.g., settled on the boundary between the object and the remaining image).

In some implementations, the detection of a contour vector oscillation may satisfy a stopping criterion for the contour algorithm. For example, user device 210 may determine that a current hash value associated with a current contour vector matches one or more previous hash values (e.g., detect a contour vector oscillation), and may stop the contour algorithm, allowing the current contour vector to be the final vector that segments the image. Alternatively, user device 210 may determine that the current hash value does not match one or more previous hash values, and may allow the contour algorithm to continue iterating.

In some implementations, the stopping criterion may require two or more contour vector oscillations (e.g., the stopping criterion may require that the current hash value match two or more previous hash values). For example, the contour algorithm may compare the current hash value with two or more previous hash values to determine whether the current hash value matches two or more previous hash values. In some implementations, the quantity of required contour vector oscillations (e.g., a minimum quantity of oscillations) may be input by a user, such as a user of user device 210. Additionally, or alternatively, the minimum quantity of oscillations may be determined by a business rule, an algorithm (e.g., the contour algorithm), a device (e.g., user device 210, server device 220, etc.), or the like. In some implementations, user device 210 may detect contour vector oscillations using a technique other than matching hash values and/or contour state vectors.

In some implementations, the stopping criterion may rely on input from a user, such as a user of user device 210. For example, user device 210 may detect one or more contour vector oscillations (e.g., when the hash value associated with the current iteration matches one or more previous hash values associated with previous iterations) and may stop and/or pause the contour algorithm. User device 210 may cause the current contour vector to be displayed, along with the image. The user (e.g., of user device 210) may determine whether the current contour vector has converged (e.g., has settled on the boundaries of the object in the image). In some implementations, the user (e.g., of user device 210) may indicate (e.g., via input to user device 210, including a keyboard, a keypad, a touchscreen, etc.) whether to continue to the next iteration of the contour algorithm, or whether to segment the image based on the current contour vector.

As further shown in FIG. 4, if the hash value does not match a previous hash value (block 440—NO), then process 400 may include storing the hash value as a previous hash value (block 450), and returning to block 410. For example, user device 210 may store the hash value in a data structure (e.g., data structure 500, FIG. 5) of previous hash values. In some implementations, user device 210 may store a finite quantity of hash values (e.g., the five hash values associated with the previous five iterations) in the data structure. For example, user device 210 may add the hash value to the data structure, and may remove (e.g., overwrite) a hash value associated with an iteration outside a finite iteration history length.

In some implementations, after storing the hash value, user device 210 may begin another iteration of the contour algorithm (e.g., return to block 410). Additionally, or alternatively, user device 210 may stop the contour algorithm based on a quantity of iterations completed by the contour algorithm. For example, user device 210 may stop the contour algorithms once an iteration quantity matches a maximum quantity (e.g., 200, 1000, etc.).

In some implementations, the maximum quantity may be defined by a user, such as a user of user device 210. For example, the user of user device 210 may input (e.g., via a keyboard, a keypad, a mouse, a touchscreen, etc.), into user device 210, a quantity defining the maximum quantity of iterations to be completed before the contour algorithm stops. In some implementations, user device 210 may determine the maximum quantity by a random determination, a business rule, an algorithm (e.g., the contour algorithm), a device (e.g., user device 210, server device 220, etc.), or the like.

As further shown in FIG. 4, if the hash value matches a previous hash value (block 440—YES), then process 400 may include segmenting the image based on the contour vector (block 460). For example, after determining that the hash value (e.g., a current hash value associated with a current iteration) matches a previous hash value, user device 210 may segment the image based on the current contour vector (e.g., the contour vector associated with the current iteration). In some implementations, user device 210 may further process the image based on the segmentation. Additionally, or alternatively, user device 210 may provide the segmented image, and/or the object segmented by contour vector, to a user (e.g., a user of user device 210) by a display associated with user device 210. For example, user device 210 may provide the object without providing a remaining portion (e.g., a non-object portion, or a portion of the image not occupied by the object) of the image.

While a series of blocks has been described with regard to FIG. 4, the blocks and/or the order of the blocks may be modified in some implementations. Additionally, or alternatively, non-dependent blocks may be performed in parallel.

FIG. 5 is a diagram of an example data structure 500 that stores information associated with one or more contour vectors. Data structure 500 may be stored in a memory device (e.g., a RAM, a hard disk, etc.), associated with one or more devices and/or components shown in FIGS. 2 and/or 3. For example, data structure 500 may be stored by user device 210.

Data structure 500 may include a collection of fields, such as iteration field 510, hash value field 520, maximum iteration field 530, and history length field 540.

Iteration field 510 may store information that identifies an iteration of the contour algorithm. In some implementations, the iteration field may be expressed as one or more characters (e.g., numbers, letters, symbols, words, etc.) used to identify an iteration of the contour algorithm. For example, iteration field 510 may include a quantity (e.g., a number) identifying the iteration. In some implementations, the quantity may correspond to the number of iterations performed by the contour algorithm since the contour algorithm began processing the image. For example, the initial iteration may be identified as "1," the fifth iteration may be identified as "5," the sixth iteration may be identified as "6," and so forth. Additionally, or alternatively, iteration field 510 may store a unique identifier (e.g., an ID number) identifying each iteration. For example, user device 210 may generate the unique identifier as the contour algorithm proceeds, iteration-by-iteration, through the process.

Hash value field 520 may store information that identifies a hash value associated with a contour vector generated during the iteration identified in iteration field 510. For example, user device 210 may generate a hash value for a contour vector generated by the contour algorithm during an iteration, and may store the hash value in hash value field 520.

In some implementations, the hash value may include a string (e.g., a combination of letters and numbers) uniquely identifying a contour vector. For example, the hash value associated with the contour vector may include a combination of numbers and/or letters of a certain length (e.g., 16 characters, 32 bytes, etc.).

Maximum iteration field 530 may store information that identifies a maximum value associated with the iteration identified in iteration field 510. For example, user device 210 may store a value indicating a maximum quantity of iterations. In some implementations, maximum iteration field 530 may indicate a stopping criterion for the contour algorithm. For example, user device 210 may compare information identifying the current iteration, as stored in iteration field 510, with information identifying the maximum iteration, as stored in maximum iteration field 530. When the current iteration matches the maximum iteration, user device 210 may stop the contour algorithm from proceeding with further iterations.

History length field 540 may store information that identifies a quantity of iterations, identified in iteration field 510, to be stored and/or searched in data structure 500. For example, user device 210 may store information associated with a subset of iterations identified in iteration field 510, the subset being identified by history length field 540.

In some implementations, user device 210 may compare the current hash value identified in hash value field 520 with a previous quantity of hash values associated with a previous quantity of iterations identified in iteration field 510, the quantity of hash values being defined by information identified in history length field 540. For example, history length field 520 may specify a certain history length (e.g., "5"), and user device 210 may store only information associated with iterations specified by the history length (e.g., only the previous five iterations).

In some implementations, history length field 540 may store information that identifies a quantity of previous iterations, identified in iteration field 510, to be searched in the data structure when comparing the current hash value identified in hash value field 520 with previous hash values. For example, user device 210 may compare the current hash value, identified in hash value field 520 and associated with the most recent iteration identified in iteration field 510, to a quantity of previous hash values defined by the value identified in history length field 540 (e.g., the previous five hash values).

Information associated with a single iteration may be represented as a row in data structure 500. For example, the fifth row in data structure 500 may correspond to an iteration of "146," indicating that the information in the fifth row is associated with the one-hundred and forty-sixth iteration of the contour algorithm. User device 210 may use a cryptographic hash function to calculate a hash value identifying the contour vector generated by the one-hundred and forty-sixth iteration of the contour algorithm. The hash value may include a unique combination of letters and numbers, "A257LK62T74P9W85" of a certain length (e.g., sixteen characters). A maximum iteration of "200" may provide a stopping point for the contour algorithm, indicating that the contour algorithm should not proceed past 200 iterations. A history length of "5" may indicate the quantity of iterations (e.g., the previous five iterations) to be stored in data structure

500. Additionally, or alternatively, the history length of "5" may indicate the quantity of previous hash values to which to compare the current hash value.

In the current example, user device 210 may compare the current hash value of "A257LK62T74P9W85" with the previous five hash values. User device 210 may detect that the current hash value of "A257LK62T74P9W85" is an exact match with the hash value associated with iteration "142," as shown in the first row of data structure 500. The matching hash values may indicate that the contour vector associated with iteration "146" is the same contour vector associated with iteration "142." The matching contour vectors (e.g., oscillating contour vectors) may indicate that the matching contour vectors have converged over the object (e.g., best identified the boundaries of the object) in the image. Based on detecting the match, user device 210 may stop the contour algorithm from completing any additional iterations.

Data structure 500 includes fields 510-540 for explanatory purposes. In practice, data structure 500 may include additional fields, fewer fields, different fields, or differently arranged fields than those illustrated in FIG. 5 and/or described herein with respect to data structure 500. Furthermore, while data structure 500 is represented as a table with rows and columns, in practice, data structure 500 may include any type of data structure, such as a linked list, a tree, a hash table, a database, or any other type of data structure. In some implementations, data structure 500 may include information generated by a device and/or component. Additionally, or alternatively, data structure 500 may include information provided from another source, such as information provided by a user, and/or information automatically provided by a device.

Figure 6:
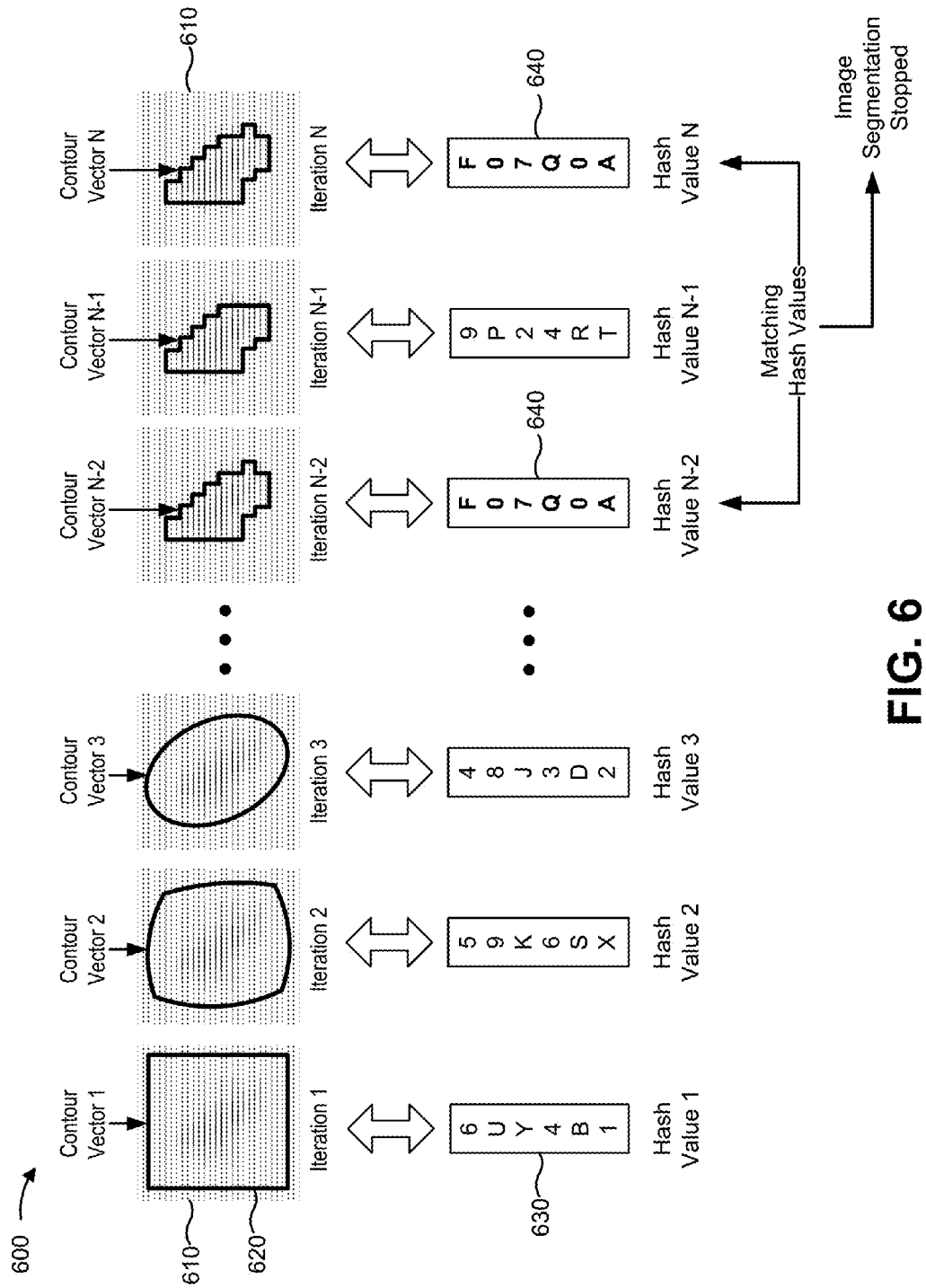
FIGS. 6 and 7 are diagrams of example implementations relating to the example process shown in FIG. 4.

FIG. 6 is a diagram of an example implementation 600 relating to example process 400 (FIG. 4). In example implementation 600, user device 210 may use a contour algorithm to segment an image over a series of iterations. For each iteration, user device 210 may use the contour algorithm to generate a contour vector, and may calculate a hash value based on the contour vector. User device 210 may compare a current hash value, associated with a most recent iteration, with one or more previous hash values associated with one or more previous iterations. When the current hash value matches a previous hash value, user device 210 may stop the contour algorithm.

As shown by reference number 610, the contour algorithm may segment an image that includes an object. The contour algorithm may include an active contour algorithm. The active contour algorithm may guide a curve through a series of iterations until the curve has settled on the boundary of the object. The active contour algorithm may start with a first iteration (e.g., "Iteration 1"). The first iteration may include an arbitrary contour vector (e.g., "Contour Vector 1") associated with the image, as shown by reference number 620.

As shown by reference number 630, user device 210 may calculate a hash value (e.g., "Hash Value 1") based on the contour vector (e.g., "Contour Vector 1") generated during the first iteration (e.g., "Iteration 1"). The hash value may include a finite quantity of characters (e.g., "6UY4B1").

As further shown by FIG. 6, the active contour algorithm may proceed through a quantity of iterations (e.g., "N" iterations). During each iteration, the active contour algorithm may generate a contour vector, and user device 210 may generate a hash value based on the contour vector. For example, the second iteration (e.g., "Iteration 2") may be associated with a particular contour vector (e.g., "Contour Vector 2") and an associated hash value (e.g., "Hash Value 2") including a unique identifier (e.g., "59K6SX"). The third iteration (e.g., "Iteration 3") may be associated with a particular contour vector (e.g., "Contour Vector 3") and an associated hash value (e.g., "Hash Value 3") including a unique identifier (e.g., "48J3D2"). In this manner, the active contour algorithm may proceed through a quantity (e.g., "N") of iterations, until a current iteration (e.g., "Iteration N") associated with particular a contour vector (e.g., "Contour Vector N") and an associated hash value (e.g., "Hash Value N") occurs.

In some implementations, user device 210 may store information associated with each iteration (e.g., information identifying an iteration number, information identifying a hash value associated with each iteration, etc.) in a data structure (e.g., data structure 500, FIG. 5). Additionally, or alternatively, user device 210 may store only a subset of information associated with each iteration, such as information associated with the five most recent iterations.

In some implementations, as the active contour algorithm proceeds, iteration-by-iteration, user device 210 may compare the current hash value (e.g., "Hash Value N") with a quantity of previous hash values associated with previous iterations. If there is no match between the current hash value and a previous hash value, the active contour algorithm may proceed to the next iteration.

As shown by reference number 640, the current hash value (e.g., "F07Q0A") associated with the current iteration (e.g., "Iteration N") may match a previous hash value (e.g., "Hash Value N-2") associated with a previous iteration (e.g., "Iteration N-2"). When user device 210 compares the current hash value (e.g., "Hash Value N") with the previous hash values (e.g., "Hash Value N-1," "Hash Value N-2," etc.), user device 210 may detect a match between the current hash value and a previous hash value (e.g., "Hash Value N-2"). The match may indicate that both iterations are associated with the same hash value, "F07Q0A." This match may indicate that the two contour vectors (e.g., "Contour Vector N-2" and "Contour Vector N"), associated with the matching hash values, are identical. Based on this detection, user device 210 may stop the contour algorithm from performing additional iterations. The current contour vector may be the final contour vector used by user device 210 to segment the image.

Figure 7:
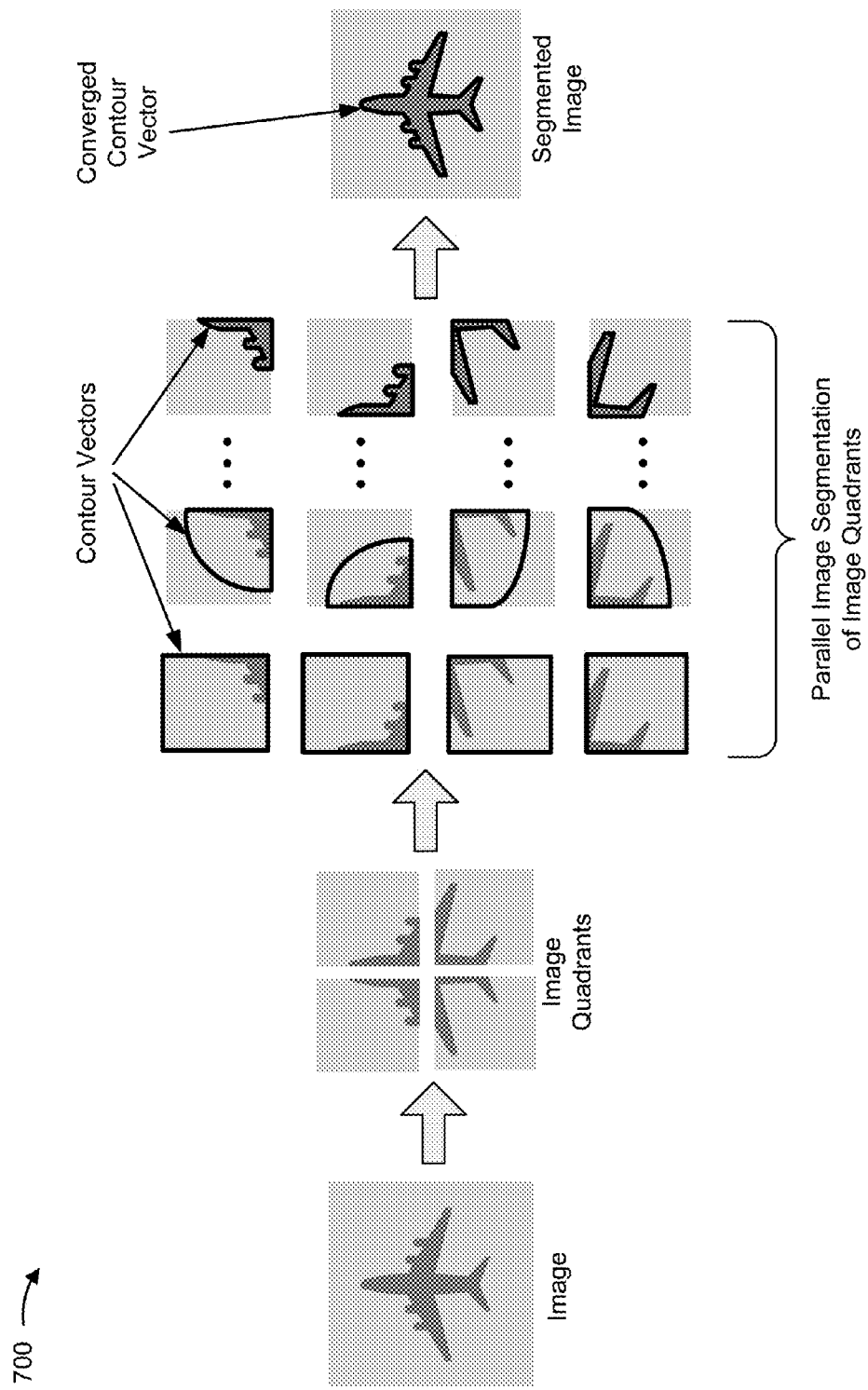

FIG. 7 is a diagram of another example implementation 700 relating to example process 400 (FIG. 4). In example implementation 700, user device 210 may divide an image into two or more image regions (e.g., subsections). User device 210 may perform image segmentation on the two or more image regions simultaneously (e.g., in parallel). User device 210 may join the image regions to form the image, with a converged contour vector.

As shown in FIG. 7, user device 210 may receive an image, and may divide the image into two or more image regions. The image may be divided into any number of image regions based on one or more attributes associated with the image, the object, and/or the image regions. The one or more attributes may include image size, object size, image shape, object shape, number of regions, or the like. As shown in FIG. 7, the image (e.g., an image of an airplane) may be divided into four image regions (e.g., image quadrants). User device 210 may use a contour algorithm to segment the image regions.

In some implementations, user device 210 may use a separate contour algorithm on each image region. For each region, the contour algorithm may proceed through a quantity of iterations. At each iteration, the contour algorithm may generate a contour vector associated with the iteration, and user device 210 may determine a hash value based on the contour vector associated with the iteration. User device 210 may store a quantity of most recent hash values (e.g., the five hash values associated with the previous five iterations) in a data structure.

In some implementations, user device 210 may store the quantity of recent hash values associated with each image region in the data structure. For example, user device 210 may divide the image into four image regions (e.g., image quadrants). User device 210 may maintain four sets of recent hash values, with each set of recent hash values associated with each of the four image regions. Additionally, or alternatively, user device 210 may generate a single hash value (e.g., by use of a cryptographic hash function) representing two or more of the hash values associated with two or more of the image regions for a given iteration of the contour algorithm.

As the contour algorithm proceeds through each iteration, user device 210 may compare the current hash value associated with the current iteration to previous hash values associated with previous iterations. If user device 210 detects that the current hash value, for a particular region, matches a previous hash value, the contour algorithm may stop. In some implementations, when the contour algorithm associated with each image region has stopped, user device 210 may combine the contour vectors associated with each image region into one contour vector (e.g., a converged contour vector) associated with the entire image (e.g., the segmented image).

In some implementations, the contour algorithm segmenting two or more regions of the image may be processed in parallel. Parallel processing may include the simultaneous use of two or more processors (e.g., two or more processors 320) to segment the two or more image regions. For example, a first contour algorithm may segment a first image region while a second contour algorithm may segment a second image region. After the first contour algorithm and the second contour algorithm have completed the process of segmenting the first image region and the second image region (e.g., the contour algorithms have stopped), a processor may combine the first image region and the second image region into a final segmented image.

Implementations described herein may determine that a contour vector has converged around the boundaries of an object in an image by detecting matching hash values (e.g., oscillations in the contour vectors) associated with the contour vectors generated during multiple iterations of a contour algorithm. Use of the hash values (e.g., computationally small, fixed length identifiers) to represent the contour vectors (e.g., computationally large, variable length vectors) may provide for more efficient (e.g., computationally efficient) calculation of the contour algorithm. Additionally, use of contour vector oscillations to provide a stopping criterion of the contour algorithm may provide for faster image segmentation.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Some implementations are described herein with respect to images. As used herein, an image may include a two-dimensional image (e.g., a plane, a surface, an area, etc.) and/or a three-dimensional image (e.g., a shape, a volume, etc.). Additionally, or alternatively, an image may include a surface in any dimension (e.g., an N-sphere, a hypersphere, etc.). Additionally, or alternative, an object included in an image, and/or a contour vector describing a boundary between an object and an image, may include objects and/or contour vectors in any dimension.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more times, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors, in communication with a memory, to:
determine, based on a first iteration of applying an algorithm that is applicable iteratively in three or more iterations, a first representation of a contour that delineates a region of an image from another region of the image;
generate a first hash value, corresponding to the first representation, by applying a first hash function to the first representation;
determine that an oscillation of representations of the contour occurs by comparing the first hash value and a second hash value that corresponds to a second representation of the contour, the second representation of the contour being determined based on a second iteration of the algorithm applied before the first iteration and before a third iteration of the algorithm that occurs between the second iteration and the first iteration, the second hash value being generated by applying a second hash function to the second representation of the contour; and
determine, based on determining that the oscillation of the representations occurs, that the representations of the contour have converged around the contour.

2. The device of claim 1, where the one or more processors, when determining that the oscillation occurs, are further to:
determine a first vector length associated with the first representation;
determine a second vector length associated with the second representation;
determine that the first vector length matches the second vector length;
compare the first hash value and the second hash value based on determining that the first vector length matches the second vector length; and determine that the oscillation occurs based on comparing the first hash value and the second hash value.

3. The device of claim 1, where the one or more processors, when determining that the oscillation occurs, are further to:
receive an indication of a quantity of hash values to which the first hash value is to be compared;
determine a plurality of hash values, including the second hash value, based on the quantity;
compare the first hash value and the plurality of hash values; and
determine that the oscillation occurs based on comparing the first hash value and the plurality of hash values.

4. The device of claim 1, where the one or more processors are further to:
provide, via a user interface, a representation of the contour and at least a portion of the image;
receive, via the user interface, user input indicating that the contour delineates the region from the other region; and
segment the image based on receiving the user input.

5. A non-transitory computer-readable medium storing instructions, the instructions comprising:
a plurality of instructions that, when executed by one or more processors, cause the one or more processors to:
determine, based on a first iteration of applying an algorithm that is applicable iteratively in three or more iterations, a first representation of a contour that delineates a region of an image from another region of the image;
generate a first hash value, corresponding to the first representation, by applying a hash function to the first representation of the contour;
determine that an oscillation of representations of the contour occurs by comparing the first hash value and a second hash value, the second hash value corresponding to a second representation of the contour, the second representation of the contour being determined based on a second iteration of the algorithm applied before the first iteration and before a third iteration of the algorithm that occurs between the second iteration and the first iteration, the second hash value being generated by applying the hash function to the second representation of the contour; and
determine, based on determining that the oscillation of the representations occurs, that the representations of the contour have converged around the contour.

6. The non-transitory computer-readable medium of claim 5, where one or more instructions, of the plurality of instructions, further cause the one or more processors to:
terminate the algorithm based on determining that the representations of the contour have converged around the contour; and
segment the image based on terminating the algorithm.

7. The non-transitory computer-readable medium of claim 5,
where the first representation and the second representation are different lengths; and
where the first hash value and the second hash value are a same length.

8. A method, comprising:
determining, based on a first iteration of applying an algorithm that is applicable iteratively in three or more iterations, a first representation of a contour that delineates a region of an image from another region of the image, the determining the first representation being performed by a device;
generating a first hash value, corresponding to the first representation, by applying a hash function to the first representation, the generating being performed by the device;
determining that an oscillation of representations of the contour occurs by comparing the first hash value and a second hash value that corresponds to a second representation of the contour, the second representation of the contour being determined based on a second iteration of the algorithm applied before the first iteration and before a third iteration of the algorithm that occurs between the second iteration and the first iteration, the second hash value being generated by applying the hash function to the second representation of the contour, the determining that the oscillation occurs being performed by the device; and
determining, based on determining that the oscillation of the representations occurs, that the representations of the contour have converged around the contour, the determining that the representations have converged around the contour being performed by the device.

9. The method of claim 8, where the image includes at least one of:
a two-dimensional image,
a two-dimensional model,
a three-dimensional image, or
a three-dimensional model.

10. The device of claim 1, where the first representation represents a first approximation of the contour of the region,
the first approximation being determined based on the first iteration of the algorithm; and
where the second representation represents a second approximation of the contour of the region,
the second approximation being determined based on the second iteration of the algorithm.

11. The device of claim 1, where the first hash function and the second hash function are a same hash function.

12. The device of claim 1, where the first representation includes a first contour vector and the second representation includes a second contour vector.

13. The non-transitory computer-readable medium of claim 5, where the algorithm is an iterative contour algorithm.

14. The non-transitory computer-readable medium of claim 5, where the first representation includes a first contour vector; and
where the second representation includes a second contour vector.

15. The non-transitory computer-readable medium of claim 5, where the first representation and the second representation approximate the contour of the region.

16. The non-transitory computer-readable medium of claim 5, where one or more instructions, of the plurality of instructions, that cause the one or more processors to determine that the representations have converged, further cause the one or more processors to:
determine that the first representation of the contour and the second representation of the contour have.

17. The non-transitory computer-readable medium of claim 5, where one or more instructions, of the plurality of instructions, that cause the one or more processors to determine that the oscillation occurs, further cause the one or more processors to:
determine that the algorithm is oscillating among a plurality of representations of the contour,
the plurality of representations including at least the first representation and the second representation.

18. The method of claim 8, where determining that the representations of the contour have converged comprises:
- determining that the first hash value and the second hash value are a same value; and
- determining that the representations of the contour have converged around the contour based on determining that the first hash value and the second hash value are the same value.

19. The method of claim 8, where determining that the oscillation occurs comprises:
- determining that the algorithm is oscillating between the first representation and the second representation.

20. The method of claim 8, where the first representation includes a first contour vector and the second representation includes a second contour vector; and
- where the algorithm includes an iterative contour algorithm.

\* \* \* \* \*